(12) United States Patent
Sugiyama (10) Patent No.: US 7,519,437 B2
(45) Date of Patent: Apr. 14, 2009

(54) CONTROL METHOD AND APPARATUS

(75) Inventor: Hiroshi Sugiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 532 days.

(21) Appl. No.: 11/288,432

(22) Filed: Nov. 29, 2005

(65) Prior Publication Data

US 2006/0122712 A1 Jun. 8, 2006

(30) Foreign Application Priority Data

Nov. 30, 2004 (JP) ............................. 2004-346514

(51) Int. Cl.
*G05B 15/00* (2006.01)

(52) U.S. Cl. ..................... 700/19; 700/17; 700/65; 700/83

(58) Field of Classification Search ............... 700/17, 700/19, 65, 83, 275–277
See application file for complete search history.

(56) References Cited

U.S. PATENT DOCUMENTS 6,967,565 B2 * 11/2005 Lingemann .................. 700/19

2003/0100962 A1 * 5/2003 Sumita et al. .................. 700/65

FOREIGN PATENT DOCUMENTS

JP 2000-224670 8/2000

OTHER PUBLICATIONS

Magazine Fujitsu, vol. 54, No. 4, pp. 285-292, 2003, "Internet-bases Robot: MARON-1".

* cited by examiner

*Primary Examiner*—Albert DeCady
*Assistant Examiner*—Charles R Kasenge
(74) *Attorney, Agent, or Firm*—Nixon & Vanderhye PC (57) ABSTRACT

A control apparatus for controlling first devices existing in an arbitrary place includes a first memory to store a plurality of device lists corresponding to a plurality of places respectively and each including device information items which indicate devices existing in corresponding one of the places, and a second memory to store a plurality of control information lists corresponding to the places respectively and each including control information items which indicate control operations for the devices existing in corresponding one of the places, and acquires first device information items indicating the first devices, detects an existence place of the first devices by comparing the first device information items with the device lists, and controls the first devices, based on one of the control information lists which corresponds to the existence place of the first devices.

5 Claims, 6 Drawing Sheets

| Device class | Model name | Production number | Maker | State |
|---|---|---|---|---|
| Air conditioner | JDR-241 | 849324 | Maker T | Normal |
| Air conditioner | JDS-441 | 264598 | Maker H | Normal |
| TV set | TV-40 | 436578 | Maker T | Normal |
| Electronic microwave | OGR-4 | 745213 | Maker T | Normal |
| Refrigerator | GG23 | 555678 | Maker P | Normal |

FIG. 5

| Place | | | | | | |
|---|---|---|---|---|---|---|
| Home | | | | | | |
| Device class | Identification Name | Model name (type) | Production number | Maker | Location | State |
| Air conditioner | Air conditioner 1 | JDR-231 | 124756 | Maker T | Living room | Normal |
| Air conditioner | Air conditioner 2 | JDS-221 | 118475 | Maker T | Bed room | Normal |
| TV set | TV set 1 | TV-21 | 234563 | Maker P | Living room | Normal |
| TV set | TV set 2 | TV-15 | 184765 | Maker S | Children's room | Normal |
| Electronic microwave | Microwave 1 | OGR-2 | 111058 | Maker T | Kitchen | Normal |
| Refrigerator | Refrigerator 2 | GR-432 | 650001 | Maker T | Kitchen | Normal |

Designate place

In the case of new place, input new place name

[Parents' house] ~201

In the case of already registered place, designate it using the following dialog box

[▶] ~202

[ OK ]~203

F I G. 6

New device has been found

Input identification names and locations

| Place | Parents' house | | | | | |
|---|---|---|---|---|---|---|
| Device class | Identification Name | Model name (type) | Production number | Maker | Location | State |
| Air conditioner | | JDR-241 | 849324 | Maker T | | Normal |
| Air conditioner | | JDS-441 | 264598 | Maker H | | Normal |
| TV set | | TV-40 | 436578 | Maker T | | Normal |
| Electronic microwave | | OGR-4 | 745213 | Maker T | | Normal |
| Refrigerator | | GG23 | 555678 | Maker P | | Normal |

| Place | Parents' house | | | | |
|---|---|---|---|---|---|
| Device class | Identification Name | Model name (type) | Production number | Maker | Location | State |
| Air conditioner | Air conditioner 3 | JDR-241 | 849324 | Maker T | Living room | Normal |
| Air conditioner | Air conditioner 4 | JDS-441 | 264598 | Maker H | Bed room | Normal |
| TV set | TV set 3 | TV-40 | 436578 | Maker T | Living room | Normal |
| Electronic microwave | Microwave 2 | OGR-4 | 745213 | Maker T | Kitchen | Normal |
| Refrigerator | Refrigerator 2 | GG23 | 555678 | Maker P | Kitchen | Normal |

FIG. 9

The following device is not found

Erase device that has become unnecessary because of, for example, discard
If not, confirm whether the device is abnormal

| | Place | Parents' house (home) | | | | |
|---|---|---|---|---|---|---|
| Erase | Device class | Identification Name | Model name | Production number | Maker | Location |
| ✓ | Air conditioner | Air conditioner 2 | JDR-221 | 118470 | Maker T | Bed room |
| | | | | | | |
| | | | | | | |
| | | | | | | |

[ OK ]

Set control operations

Setting of control operations of microwave 2

| Control operation | Execution timing | Use/nonuse |
|---|---|---|
| Report of finish | When cocking is finished | Not use |
| Report of abnormality | When abnormality occurs in device | Use |
| Cocking menu set | When user instructs | Use |
| | | |

[OK]

F I G. 10

| Place | Parents' house | | |
|---|---|---|---|
| Identification Name | Control operation | Execution timing | Execution/non-execution |
| Air conditioner 3 | Voice operation | When user instructs | Execute |
| Air conditioner 4 | Voice operation | When user instructs | Not execute |
| TV set 3 | Voice operation | When user instructs | Execute |
| Microwave 2 | Report of finish | When cocking is finished | Not execute |
| Microwave 2 | Report of abnormality | When abnormality occurs in device | Execute |
| Microwave 2 | Cocking menu set | When user instructs | Execute |
| Refrigerator 2 | Report of abnormality | When abnormality occurs in device | Execute |
| | | | |

F I G. 11

CONTROL METHOD AND APPARATUS

CROSS-REFERENCE TO RELATED APPLICATIONS

This application is based upon and claims the benefit of priority from prior Japanese Patent Application No. 2004-346514, filed Nov. 30, 2004, the entire contents of which are incorporated herein by reference.

BACKGROUND OF THE INVENTION

1. Field of the Invention

The present invention relates to a control method and apparatus for controlling devices existing in arbitrary places, such as domestic devices or OA devices.

2. Description of the Related Art

So-called home robots or servers have been proposed as control apparatuses for controlling domestic devices including home appliances. Most conventional control apparatuses for domestic devices perform one-way control of the devices, using, for example, a robot with an infrared remote control function, as is described in, for example, document 1 ("Internet Compatible Robot: MARON-1", Fujitsu Journal, July, 2003, vol. 54, No. 4, pp. 285-292). Recently, however, so-called intelligent home appliances, which are connected to home networks and can check and control the states of home devices, have been researched and developed, thereby realizing more accurate control.

As home network schemes, protocols, such as Echonet (trademark) and universal plug-and-play (UPnP), have been proposed. Home robots or home servers detect home appliances in accordance with such protocols, and check or control their states. For instance, a home robot can activate an air conditioner in response to a user's voice request "Turn on the air conditioner", or can perform surveillance in response to an alarm raised by a crime-prevention sensor.

Further, document 2 (Jpn. Pat. Appln. KOKAI Publication No. 2000-224670) discloses a home controller for controlling home appliances, in which the position of a user can be utilized as a control rule. For example, this controller can change the power-on time of an air conditioner in accordance with a change in the homecoming time of the user.

The above-mentioned home network protocols can only discriminate, for instance, the types of home appliances. To activate home appliances or carry out surveillance in response to the detection of an abnormality, it is necessary for the user to register, for instance, the locations of the air conditioner and crime-prevention sensor in relation to a map of the house stored in the robot. It is also necessary for the user to set, for example, which air conditioner should be activated when the voice request "Turn on the air conditioner" is issued, or to set which action program should be taken when the crime-prevention sensor generates an alarm.

Accordingly, in the case of the conventional home robot, when the user moves, along with the home robot, from the house to another place, such as their parents' house or country home, they must perform the above-described setting concerning the robot before moving. After the user moves from the house to another place, the to-be-controlled air conditioner, for example, is changed, therefore the correspondence between the map and home appliances set in the robot must be changed.

Further, the setting as to whether a certain behavior program should be executed may change even in the same situation. For instance, at home, the user may want the home robot to issue a message that washing has finished, whereas at their parents' house, they may not need the message. It is very troublesome if the user must perform a setting change whenever, for example, they move from one house to another house.

In light of the above, the prevent invention aims to provide a device control method and apparatus for easily realizing automatic changes in setting related to the control of devices when the control apparatus is carried from one place to another.

BRIEF SUMMARY OF THE INVENTION

According to embodiments of the present invention, the control apparatus for controlling first devices existing in an arbitrary place includes a first memory to store a plurality of device lists corresponding to a plurality of places respectively and each including device information items which indicate devices existing in corresponding one of the places; and a second memory to store a plurality of control information lists corresponding to the places respectively and each including control information items which indicate control operations for the devices existing in corresponding one of the places; and acquires first device information items indicating the first devices; detects an existence place of the first devices by comparing the first device information items with the device lists; and controls the first devices, based on one of the control information lists which corresponds to the existence place of the first devices.

DETAILED DESCRIPTION OF THE INVENTION

Figure 1:
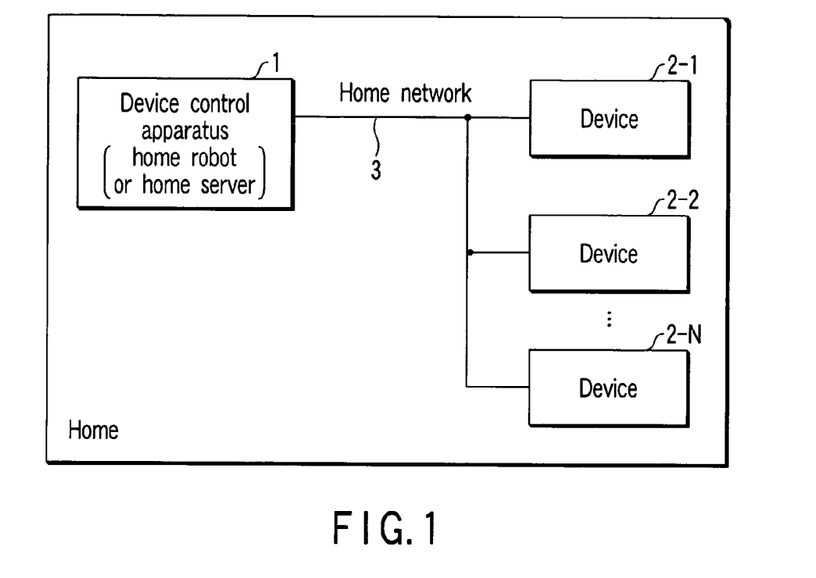
FIG. 1 is a block diagram illustrating an example of use of a device control apparatus according to an embodiment of the invention.

As shown in FIG. 1, a device control apparatus 1 according to an embodiment of the invention controls devices 2-1 to 2-N, such as home appliances and illumination devices. Specifically, the device control apparatus 1 may serve as a home robot movable in a room or a home server fixed in position in a room. The device control apparatus 1 is connected to the devices 2-1 to 2-N via a home network 3.

Various schemes, such as Echonet and universal plug-and-play, can be used as protocols for the home network 3. In any scheme, information necessary for discriminating the devices 2-1 to 2-N is supplied to the device control apparatus 1 via the home network 3, to enable the apparatus 1 to detect the state of each device and control them.

Figure 2:
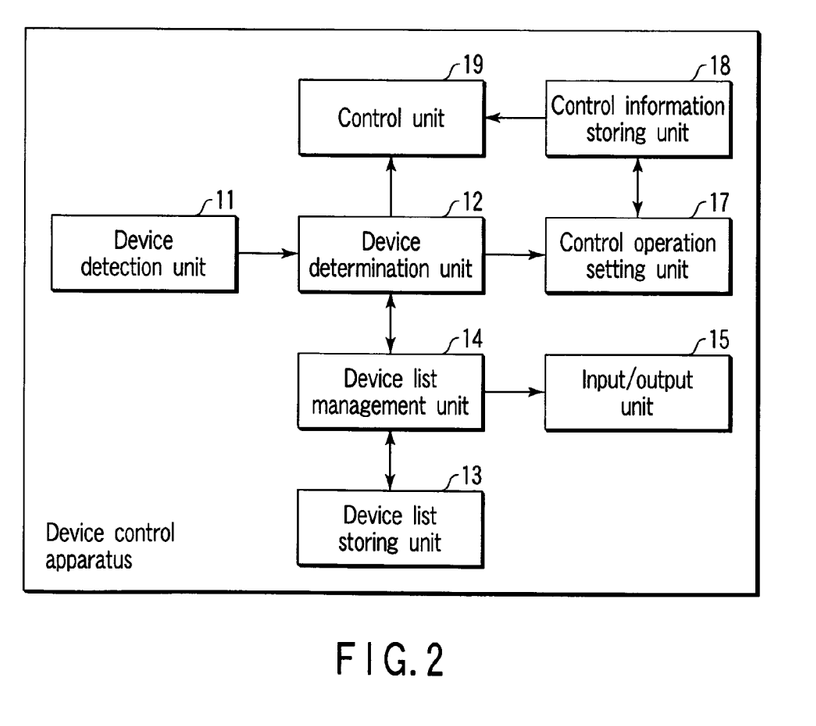
FIG. 2 is a block diagram illustrating the device control apparatus according to the embodiment of the invention.

Referring to FIG. 2, the device control apparatus 1 will be described in detail.

Figure 5:
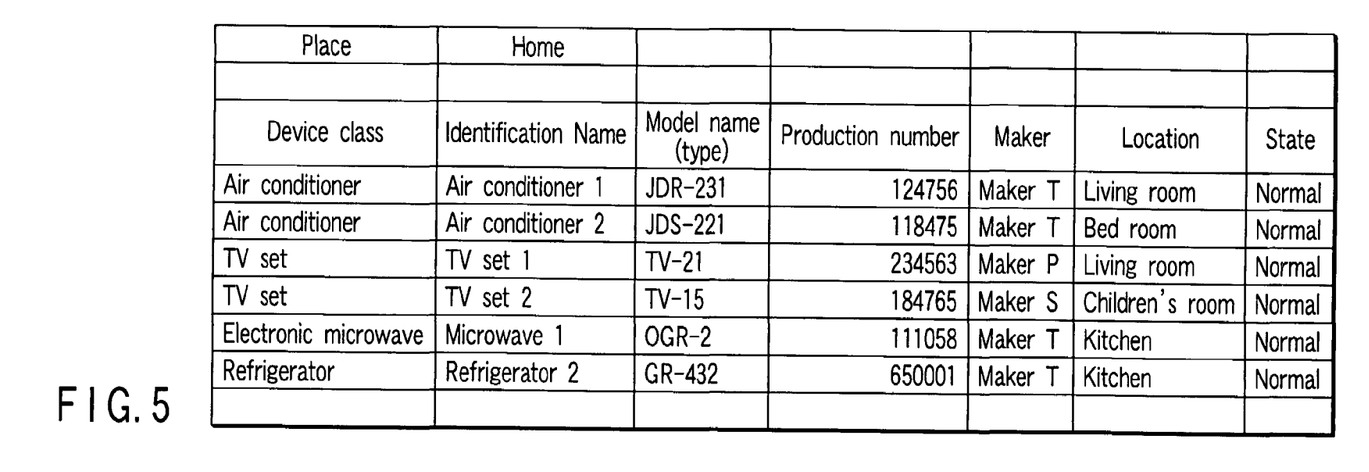
FIG. 5 is a table illustrating a device list example stored in the device list storing unit appearing in FIG. 2.

In FIG. 2, a device detection unit 11 detects the devices 2-1 to 2-N, connected to the home network 3 of FIG. 1, in accordance with the protocol employed in the network 3, and outputs device information items for specifying the detected devices. The device information item output from the device detection unit 11 is input to a device determination unit 12. A device list storing unit 13 stores a list of device information items that specifies the devices already detected at each place by the device detection unit 11, i.e., stores a device list. Accordingly, the device list storing unit 13 stores a plurality of device lists acquired at different places. As shown in FIG. 5, each device list contains identification information indicating a certain place, and device information items indicating devices existing in the place.

The device determination unit 12 compares device information items, output from the device detection unit 11, with the device lists stored in the device list storing unit 13, thereby detecting the place in which the device information items exist. In other words, when the device determination unit 12 detects a device list corresponding to the device information items, it determines that the place corresponding to the detected list is the existence place of the devices detected by the device detection unit 11. In contrast, when there is no device list that corresponds to the device information items output from the device detection unit 11, the device determination unit 12 determines that each device detected by the device detection unit 11 is a new one.

A device list management unit 14 manages the device lists stored in the device list storing unit 13. Specifically, the device list management unit 14 edits each device list when a change in the number of devices is detected in the device list corresponding to the place determined by the device determination unit 12. The device list management unit 14 is connected to an input/output unit 15 including an input unit such as a keyboard, pointing device, etc which enables a user to input data for device list editing, and including an output unit for providing the user with a screen for editing.

A control operation setting unit 17 sets, for each device determined a new device by the device determination unit 12, the control operation(s) that should be performed by the home robot or home server formed of the device control apparatus 1, and outputs control information indicating the control operation(s).

A control information storing unit 18 stores the control information items, each indicating the control operations of devices already set by the control operation setting unit 17, in relation to the place corresponding to the device list stored in the device list storing unit 13.

A control unit 19 reads, from the control information storing unit 18, the control information item corresponding to the place determined by the device determination unit 12, and controls the devices 2-1 to 2-N in accordance with the read control information item.

The device control apparatus 1 stores each control information item for devices in each place in the control information storing unit 18, and automatically changes the setting in accordance with the place to which the user moves along with this apparatus. Namely, it is not necessary for the user to re-perform the setting of the device control apparatus 1 even if they move from one place to another along with the apparatus 1.

Figure 3:
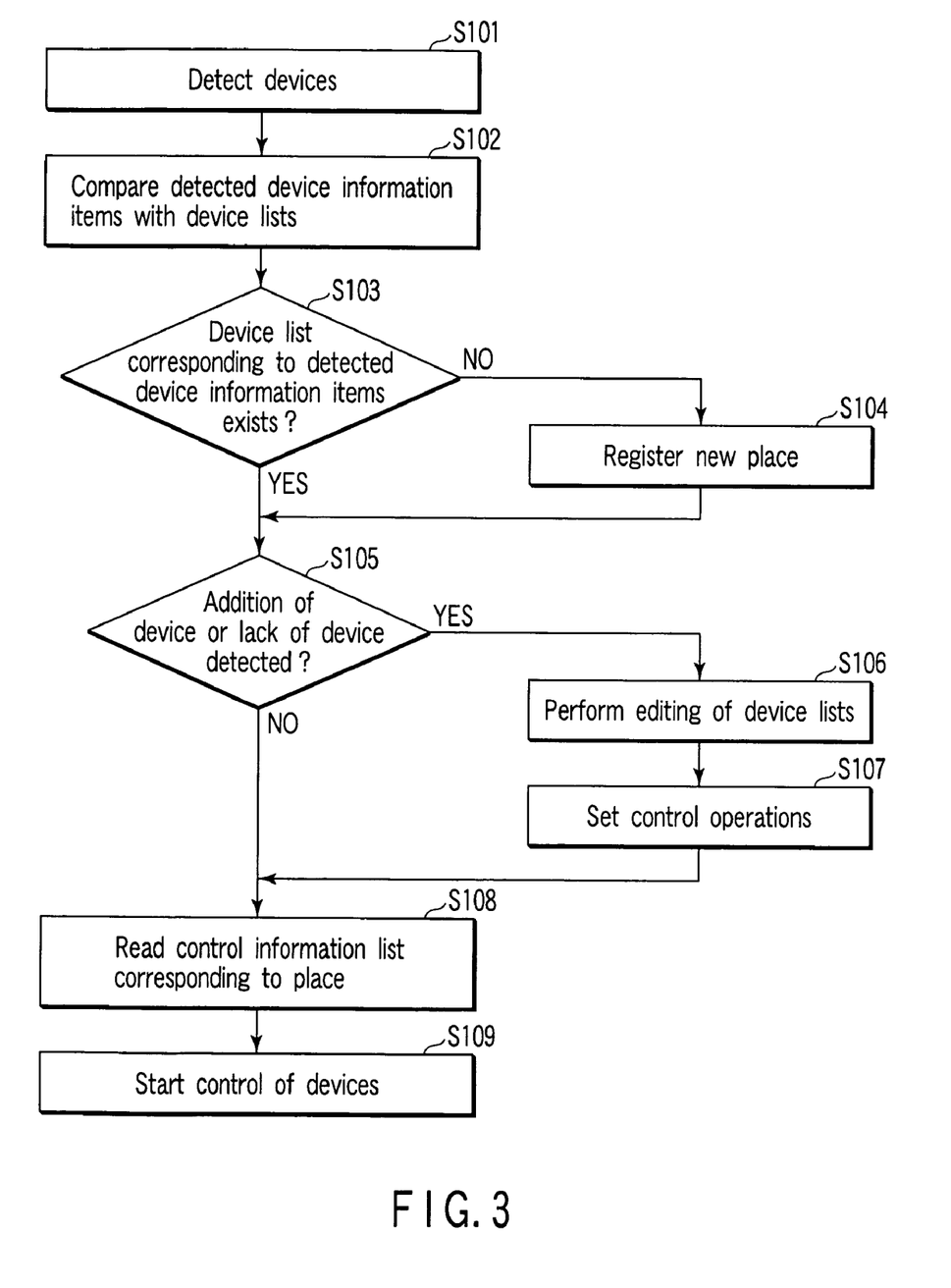
FIG. 3 is a flowchart useful in explaining the operation procedure of the device control apparatus of FIG. 2.

Referring to the flowchart of FIG. 3, the operation of the device control apparatus 1 of FIG. 2 will be described. In the description below, a home robot is used as an example of the controller of the home network, i.e., as the device control apparatus 1, and the case where the home robot, which is usually used by a user at home, is carried for the first time to their parents' house is used.

Firstly, the device detection unit 11 detects the devices 2-1 to 2-N (step S101). When the home network 3 is Echonet, the devices 2-1 to 2-N can send their own device information item to the home robot in response to a signal supplied from the home robot (device control apparatus 1), or can periodically send the device information item to the home robot.

Thus, when each of the devices 2-1 to 2-N sends its own device information item to the home robot, the device detection at step S101 is executed. When the home network 3 is Echonet, device information item includes an Echonet ID as a uniquely assigned identifier, the device information item including the class of device (Echonet class), and unique information for specifying each device, such as "Air conditioner" or "Refrigerator", "Model name (model number)", or "Production number".

Figure 4:
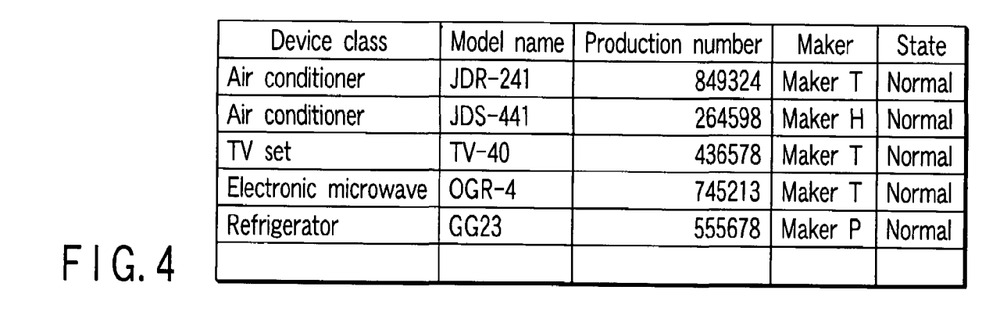
FIG. 4 is a table illustrating device information examples acquired by the device detection unit appearing in FIG. 2.

FIG. 4 shows examples of device information items acquired by the device detection unit 11 when the home robot is carried to the parents' house and activated. In FIG. 4, item "Device class" indicates the class of each device. Items "Model name", "Production number" and "Maker" are information items unique to each device and acquired from Echonet. Item "State" indicates the present state of each device. In the case of FIG. 4, and the states of all devices are "Normal".

After that, the device determination unit 12 compares the device information items acquired at step S101 with the device lists stored in the device list storing unit 13 (step S102). FIG. 5 shows a device list example set initially when a user has moved to their parents' house, along with the home robot. For facilitating the explanation, the device list is expressed in a table. Actually, however, it is a structured document written by, for example, Extensible Markup Language (XML).

In FIG. 5, item "Place" of the device list indicates identifier of place (place name) corresponding to the device list. In this case, the item "Place" indicates that the device list corresponds to "Home". Each row of the table indicates device information item corresponding to a device. Item "Device class" indicates the class of each device, and corresponds to, for example, Echonet class acquired from Echonet. Item "Identification name" is identifier of each device for uniquely identifying each device. The identifier is serial number automatically generated in units of classes, or is determined by user's designation. Items "Model name", "Production number" and "Maker" are information items unique to each device and acquired from Echonet. Item "Location" indicates the location of each device at home. In the case of FIG. 5, the locations are expressed by floor names, such as "living room" and "kitchen". However, if the user would like to perform accurate control, for example, to accurately move the home robot to each device, the locations of devices may be expressed using coordinates. Item "State" indicates the present state of each device, and all devices are "Normal" state in this case. However, if a certain device is stopped for some reason, "Stopped" is set in the "State" cell corresponding to the device. Similarly, if a certain device is out of order, "Abnormal" is set in the "State" cell corresponding to the device.

At step S102, the device information items output from the device detection unit 11, which are shown in FIG. 4, are compared with each of the device lists stored in the device list storing unit 13, which are shown in FIG. 5. As a result, the place in which devices whose device information items output from the device detection unit 11 exist is detected. Specifically, the degree of concordance between the device information items output from the device detection unit 11 and each device list stored in the device list storing unit 13 is calculated. From the calculation, it is determined that the place indicated by item "Place" in the device list (corresponding to the detected device information items), which is included in the device list having degree of concordance not lower than a preset reference value and has the highest concordance degree among the concordance degrees corresponding respective device lists stored in the device list storing unit 13, is the present existence place of the home robot. The method for determining the "place" at step S102 will be described later in more detail.

Subsequently, if it is determined at step S103 that there is a device list corresponding to the device information items output from the device detection unit 11 (Yes at step S103), the program proceeds to step S105. In contrast, if there is no such device list (No at step S103), the program proceeds to step S104.

When the home robot cannot access, for some reason, each device corresponding to device information item included in the device lists of the device list storing unit 13, or when the home robot is moved to a first-time place, it is determined at step S103 that there is no device list corresponding to the device information items output from the device detection unit 11. The case where the home robot is moved to the first-time place corresponds to, for example, the case where the home robot is brought to the parents' house for the first time.

Figure 6:
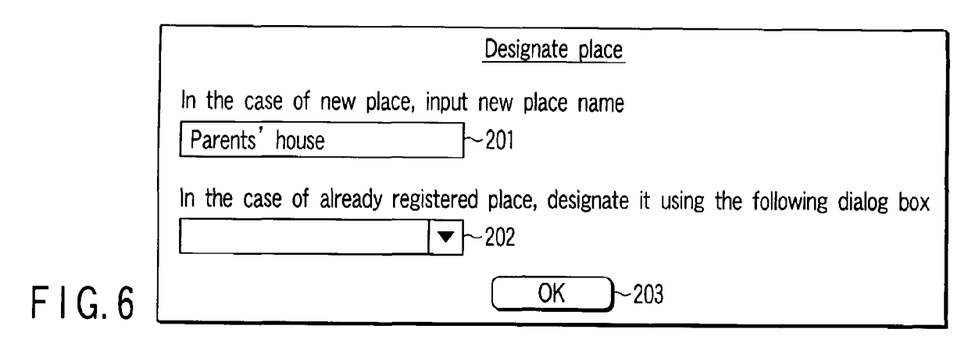
FIG. 6 is a view illustrating a screen example provided for a user when the detected device information is not contained in the device list.

FIG. 6 shows a screen example displayed on the input/output unit 15, which enables the user to confirm the place when it is determined that there is no device list corresponding to the device information items output from the device detection unit 11 at step S103, i.e., when it is determined that the existence place of the device information items is a new place other than the places indicated by the device lists stored in the device list storing unit 13. The user inputs necessary data, using the screen of FIG. 6 displayed on the input/output unit 15. For instance, when the home robot has been moved to a new place, the name of the new place is input to a first input field 201 on the screen of FIG. 6 for permitting a new place name to be input. On the other hand, when the home robot is not moved, the name of the place, in which the home robot exists at present, is selected from the already registered place names and fixed in a second input field 202 on the screen of FIG. 6. Lastly, a button 203 is pushed to secure the place name written in the first or second field 201 or 202. When a new place name is input to the first input field 201, a new device list with no device information is generated and stored in the device list storing unit 13.

After a new place is registered at step S104, the program proceeds to step S105. Also when the device list corresponding to the device information items detected at step S103 is acquired, the program proceeds to step S105.

At step S105, the device list acquired at step S103 as a result of comparison by the device determination unit 12 is compared with the detected device information items, thereby determining whether the detected device information items include new device information item that is not included in the device list, and whether the device list includes device information item that is not included in the detected device information items. If such device information item is detected, i.e., if addition of a new device or lack of a certain device is detected in the place corresponding to the detected device list, the program proceeds to step S106. In contrast, if such device information item is not detected, i.e., if addition of a new device or lack of a device is not detected in the place corresponding to the device list, the program proceeds to step S108. Further, if a new place is registered at step S104, the program proceeds to steps S105 and S106 to register the device information items detected in the new place. At step S106, the user performs editing, such as addition of device information indicating the new device to the device lists, or erasure of the device information item that is not included in the detected device list.

Figure 7:
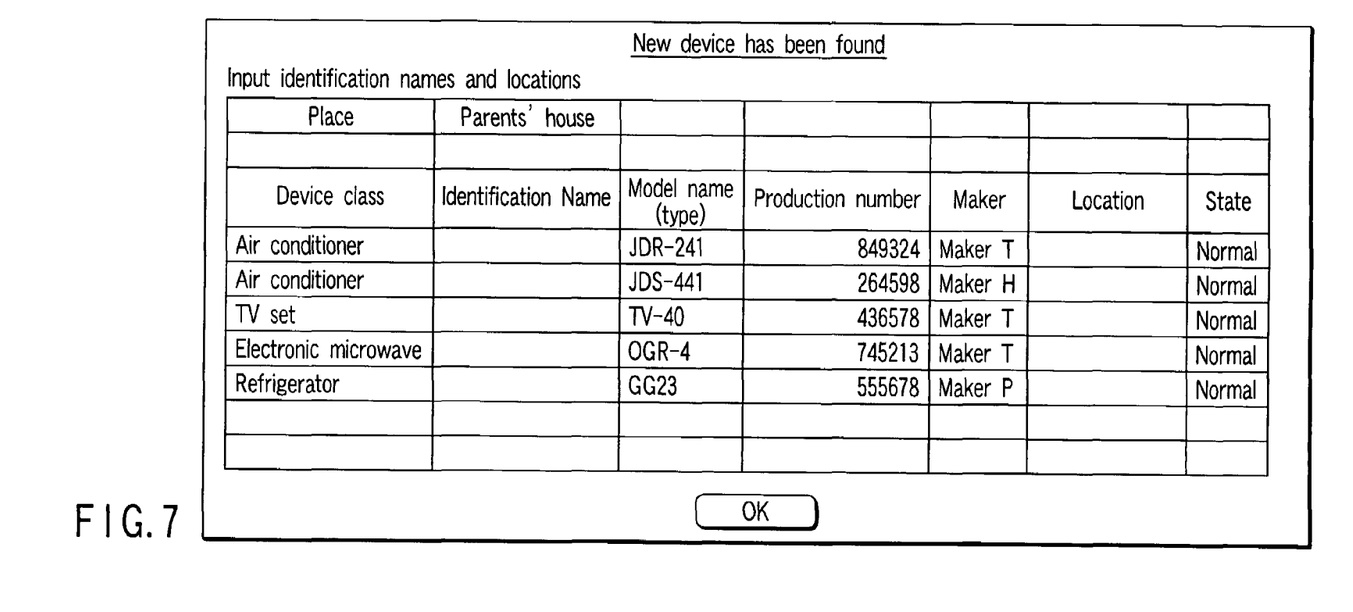
FIG. 7 is a view illustrating a screen example provided for the user when a new device is added.

FIG. 7 shows a screen example displayed for the user when they add new device information items to a certain device list at step S106. This screen is displayed, for example, when it is determined at step S103 that the device information items output from the device detection unit 11 exist in the new place.

Figure 8:
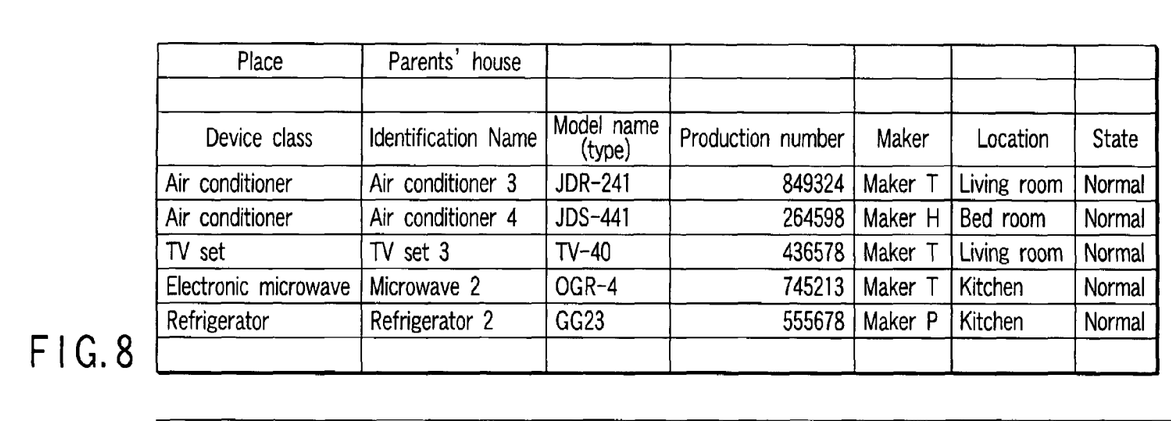
FIG. 8 is a view illustrating a device list example newly stored in the device list storing unit of FIG. 2.

FIG. 7 shows a screen image, which displays new device information items corresponding to the devices detected in a new place, i.e., "Parents' house", and which requests the user to fill the blank cells, i.e., the cells corresponding to items "Identification name" and "Location". Note that "Identification name" cells may be automatically filled by automatically imparting serial numbers to the devices recited in the "Device class" cells, i.e., by automatically imparting thereto default values. In certain home network specifications, since "Location" values can be acquired, they may be used as "Location" default values. When the "OK" button is pushed after the blank cells are filled, the device lists in the device list storing unit 13 are updated. For example, such a device list as shown in FIG. 8 is stored in the device list storing unit 13 in relation to "Parents' house".

Figure 9:
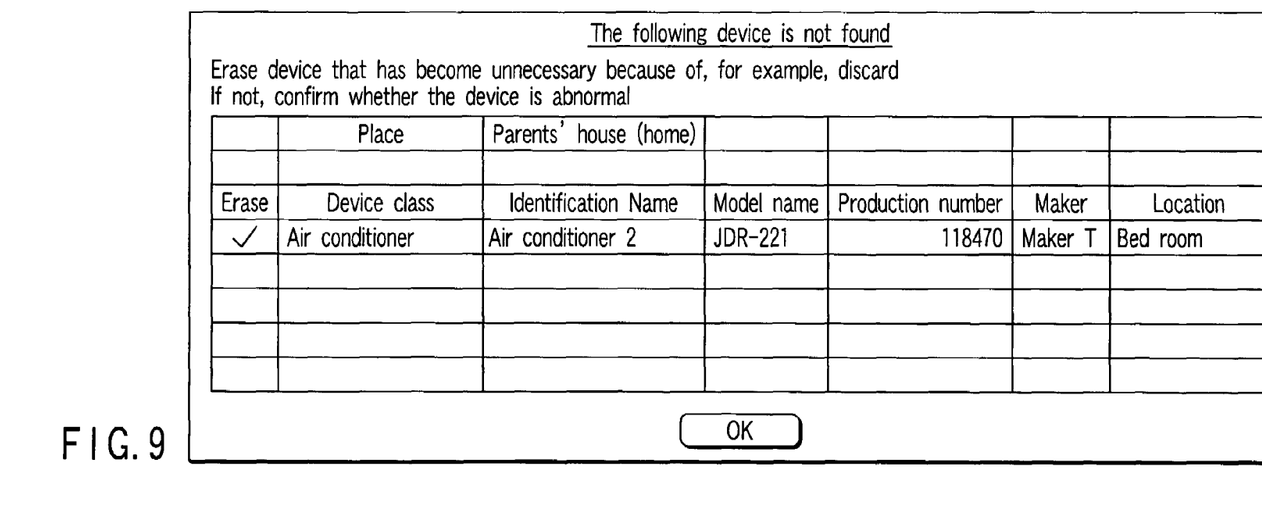
FIG. 9 is a view illustrating a screen example provided for the user when certain devices are not found.

FIG. 9 shows a screen example provided for the user when one or more device information items are erased from the detected device list. When, for example, the comparison result of the device determination unit 12 indicates that the detected device list stored in the device list storing unit 13 contain device information item that is not found by the device detection unit 11, the screen of FIG. 9 displays this device information item. In other words, when the detected device list contain a device information item that is not identical to any of the device information items output from the device detection unit 11, the screen of FIG. 9 displays this device information item. Specifically, FIG. 9 shows the case where a device corresponding to an identification name of "Air conditioner 2" included in the detected device list of FIG. 5 corresponding to the user's home is not found by the device detection unit 11.

It is considered that the reason why the device is not found is that the device detection unit 11 cannot access it for some reason, or that the device is discarded and does not exist any more. Accordingly, the screen of FIG. 9 requests the user to confirm the reason why "Air conditioner 2" is not found, and to erase "Air conditioner 2" from the device list of FIG. 5 if it is already discarded.

When the user has pushed the "OK" button on the screen of FIG. 9 to erase the device, a row of cells corresponding to the identification name of "Air conditioner 2" are erased from the device list of FIG. 5. Thus, the device list in the device list storing unit 13 are updated. Further, control information item corresponding to "Air conditioner 2" is erased from the control information storing unit 18, whereby the control information storing unit 18 is also updated.

After the device list is edited as described above at step S106, setting for control operations to be performed for a new device, if there is any, is carried out (step S107).

Figure 10:
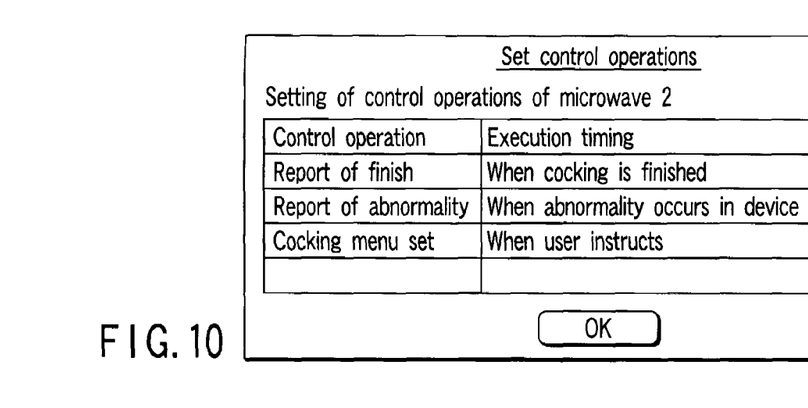
FIG. 10 is a view illustrating a screen example provided for the user when control operations are set.

Referring now to FIG. 10, a description will be given of set control operation examples. FIG. 10 shows a screen example displayed on the input/output unit 15 when control operations are set for a device corresponding to the identification name of "Microwave 2" appearing in FIG. 8. In the case of, for example, Echonet, the properties of each device and events to be reported are preset in units of classes. Accordingly, the control operations of the home robot can be preset in units of classes, based on the preset properties or events.

In the case of FIG. 10, "Report of finish", "Report of abnormality" and "Cooking menu set" are prepared as control operations provided by the home robot for an electronic microwave. The screen of FIG. 10 permits the user to determine whether they utilize each control operation concerning the device "Microwave 2". The control operation "Report of finish" is a function for making the home robot search for the user to report the finish of cooking, when the electronic microwave has informed the home robot of an event indicating the finish of cooking (this is called "an execution timing"). Similarly, the control operation "Report of abnormality" is a function for making the home robot inform the user of an abnormality in the electronic microwave when the electronic microwave has informed the home robot of an event indicating the abnormality (this is also called "an execution timing"). Further, the control operation "Cooking menu set" is a function for making the home robot set a cooking program in the electronic microwave in accordance with cooking food designated by the user when the user has instructed the cocking (this is also called "an execution timing"). By virtue of these functions, complex button operations can be avoided.

Figure 11:
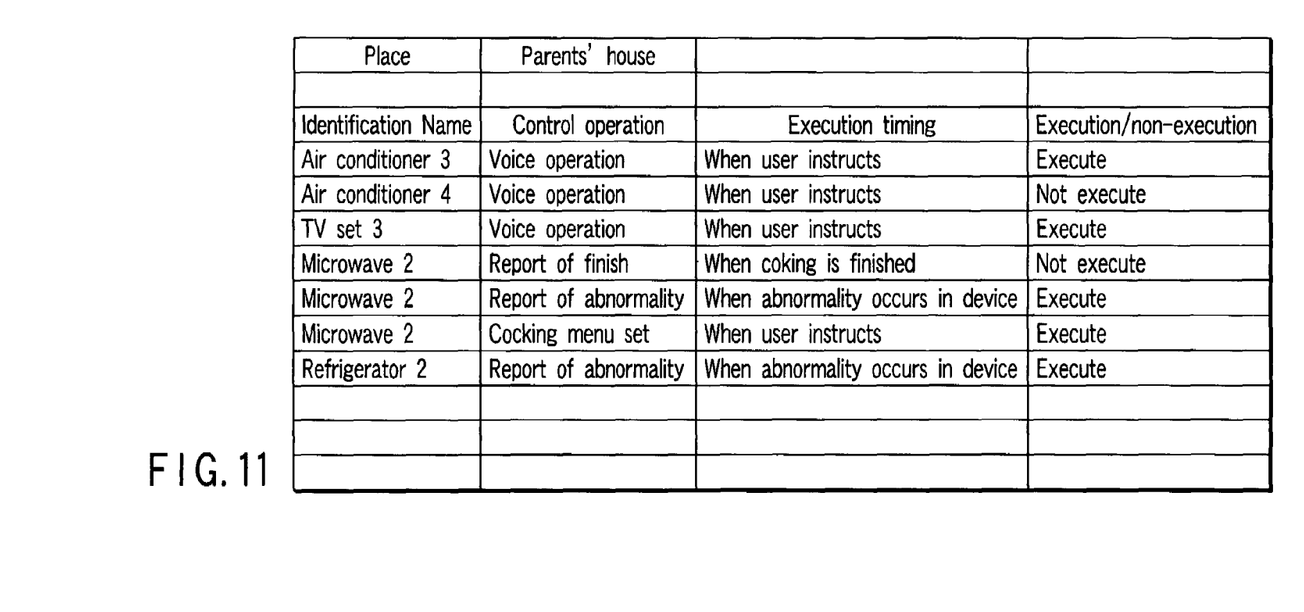
FIG. 11 is a table illustrating examples of operation control information items stored in the operation control information storing unit of FIG. 2.

If such control operations as shown in FIG. 10 are set for each device shown in FIG. 8, the control operation setting unit 17 generates control information list as shown in FIG. 11 in relation to "Parents' house", and this control information list is stored in the control information storing unit 18. When the control operation setting screen shown in FIG. 10 is displayed, if certain control information item concerning control operation setting for the same device as a setting target device is included in a control information list corresponding to another place, which is already stored in the control information storing unit 18, it may be displayed the certain control information item as default values for the setting target device. Further, if certain control information item concerning control operation setting for the same type (model name) as that of a setting target device is included in a control information list corresponding to another place, which is already stored in the control information storing unit 18, it may be displayed the certain control information item as default values for the setting target device. This way can reduce the amount of work required for setting, if the user's setting inclination is not based on the place, but on the type (model) of device.

After that, control information list corresponding to the place detected by the device determination unit 3, or corresponding to the newly registered place is selected and read from control information list stored in the control information storing unit 18 (step S108). Based on the read control information list, the control unit 19 executes the control operations for the devices in the detected or newly registered place (step S109).

The process at step S109 will be described, using the control information list shown in FIG. 11 as an example. The control unit 19 executes a Control operation indicated in the cell of item "Control operation" in a control information item that is included in the control information list of FIG. 11 and that includes "Execute" in the cell of item "Execution/non-execution", if the condition indicated in the cell of item "Execution timing" in the control information item is satisfied. For instance, electronic microwaves compliant with Echonet have a function for reporting a change in their states as a so-called event to the home robot via the network. Further, when coking is finished, these microwaves are set to send a predetermined code.

The home robot always surveys reports sent from the devices via the home network, and can determine from the reports whether the condition for "Execution timing" is satisfied. Accordingly, the home robot detects the finish of cooking by microwave 2 from an event report, based on the control information list of FIG. 11, and causes, for example, a voice synthesis section incorporated in the robot to generate a text of, for example, "cooking is finished".

A description will now be given of the method employed at step S102 of FIG. 3 for determining a device list corresponding to the device information items detected at step S101.

Firstly, the degree of concordance between the device information items corresponding to the devices detected by the device detection unit 11, and the device information items of each device list stored in the device list storing unit 13 is computed, thereby selecting the device list of the highest concordance degree. Specifically, assuming that the device detection unit 11 has detected N devices (device information items) di (i=1 to N), and the device list storing unit 13 stores M device lists Lj (j=1 to M), the degree of concordance Ej between the detected devices di and each device list Lj is given by, for example, the following equation (1):

$$Ej = \left( \sum_{i=1}^{N} w(di) \times f(di, Lj) \right) / N \tag{1}$$

where w(di) is a weighting coefficient determined from the attribute of each device di, and f(di, Lj) is a function in which if a device di corresponds to one of the device information items of each device list Lj, "1" is returned, whereas if it corresponds to none of the device information items of each device list Lj, "0" is returned. The determination as to whether the detected device di corresponds to one of the device information items of each device list Lj can be realized by comparing an item (or items) of the device di, which can uniquely specify the device, with that (those) of each list Lj. For instance, in the device list shown in FIG. 4, the combination of the items "Model name" and "Production number" is compared therebetween.

The degree of concordances Ej concerning all device lists Lj are computed, and the device list of the highest Ej is selected therefrom. In a usual use as in the case where the home robot is moved from home to the parents' house, identical devices are seldom used in different places. Therefore, only a single device list has to have a significantly high Ej value. Therefore, usually, the same weighting coefficient w(di) may be assigned to all devices.

In an environment having a complex network structure, such as an office, mobile devices, such as note PCs or PDAs, exist, which may be each used in different places. In this environment, assume that the present embodiment is applied to the case where the devices are moved from one room to another. In this case, device information item indicating the same device may be stored in device lists corresponding to different places. To deal with this, greater values should be assigned to w(di) corresponding to devices set in a fixed location, such as an air conditioner and illumination device, than to w(di) corresponding to mobile devices, thereby the greater in number of device information items that correspond to devices that set in fixed locations and that corresponds to detected device information items the device list has, the higher degree of concordance the device list has.

Subsequently, it is determined whether the degree of concordance between the detected device information items and the selected device list is higher than a predetermined reference value, and if it is higher than the value, they are considered identical to each other. If the degree of concordance is lower than the reference value, it can be considered that the present place is a new place not yet registered, or some devices cannot be accessed for some reason. Therefore, the program proceeds to step S104, where registration of the new place or detection of the reason is performed.

If the same weighting coefficient w(di) is imparted to all devices, the degree of concordance can be determined based on the ratio of detected device information items to all device information items including in each device list. When it is sufficient if the ratio is 0.5, the reference value is set to 0.5.

By storing each control information list indicating control operations for the devices existing in each place, the home robot can automatically switch the control operations in accordance with the present place of itself. For instance, assume that a user brings a home robot, usually used at home, to their parents' house, and then brings back to home. When the home robot is activated at home, it detects from the device configuration on the home network that it is returned to home, thereby automatically returning the setting concerning control operations to that at home.

In general, methods for detecting a position include the global positioning system (GPS) that can be used out of doors, position information services for mobile phones utilizing base stations, and the like. In these positioning methods, positions are specified mainly based on the latitude and longitude. The GPS is hard to use at home at which a home robot is used. The positioning information services are not always usable indoors. Further, in the latter case, positioning accuracy varies between the schemes employed and/or places, and a certain use fee is required every month. In contrast, in the present invention, the existence place of each device is determined by comparing device information items of detected devices with device lists stored in device list storing unit 13. Namely, the existence place of each device can be determined easily at no charge.

As described above in detail, in the embodiment of the invention, control information lists that indicate control operations for devices are stored in units of places, and when a control apparatus 1 is moved from one place to another, it can detect the present location and switch the control information list in accordance with the present location. Furthermore, the determination of the existence place of the control apparatus 1 can be achieved by simply comparing detected device information items with device lists. In addition, setting concerning control operations for each device can be easily changed after the control apparatus 1 is moved.

What is claimed is:

1. A control method of controlling devices existing in an arbitrary place, comprising:
    storing, in a first memory, a plurality of device lists, the device lists corresponding to a plurality of places respectively and each including device information items which indicate devices existing in a corresponding one of the places;
    storing, in a second memory, a plurality of control information lists corresponding to the places respectively, each of the control information lists including control information items which indicate control operations for the devices existing in a corresponding one of the places;
    acquiring device information items indicating the devices;
    calculating a degree of concordance between the device information items of each of the device lists and the device information items acquired, to obtain degrees of concordance with respect to the device lists;
    detecting, as an existence place of the devices, one of the places which corresponds to one of the device lists whose degree of concordance is higher than a preset value and is a maximum of the degrees of concordance;
    selecting a control information list corresponding to the existence place of the devices among the control information lists; and
    controlling the devices, based on the control information list corresponding to the existence place of the devices.

2. The control method according to claim 1, wherein the detecting detects that the devices exist in a new place when the degrees of concordance are lower than the preset value, and wherein the control method further comprises generating a new device list corresponding to the new place other than the places and including the device information items acquired, when it is detected in the detecting that the devices exist in the new place.

3. A control apparatus for controlling devices existing in an arbitrary place, comprising:
    a first memory to store a plurality of device lists corresponding to a plurality of places respectively and each including device information items which indicate devices existing in a corresponding one of the places;
    a second memory to store a plurality of control information lists corresponding to the places respectively and each including control information items which indicate control operations for the devices existing in a corresponding one of the places;
    an acquisition unit configured to acquire device information items indicating the devices;
    a detection unit configured (a) to calculate a degree of concordance between the device information items of each of the device lists and the device information items acquired, to obtain degrees of concordance with respect to the device lists, and (b) to detect, as an existence place of the devices, one of the places which corresponds to one of the device lists whose degree of concordance is higher than a preset value and is a maximum of the degrees of concordance; and
    a control unit configured to control the devices, based on one of the control information lists which corresponds to the existence place of the devices.

4. The control apparatus according to claim 3, wherein the detection unit detects that the devices exist in a new place when the degrees of concordance are lower than the preset value, and wherein the control apparatus further comprises a generation unit configured to generate a new device list corresponding to the new place other than the places and including the device information items acquired, when the detection unit detects that the devices exist in the new place.

5. The control apparatus according to claim 3, wherein a weighting coefficient assigned to stationary devices included in the devices is greater than a weighting coefficient assigned to mobile device included in the devices, the weighting coefficient being assigned when the degrees of concordance are calculated.

* * * * *